United States Patent Office 2,774,750
Patented Dec. 18, 1956

2,774,750

MONOMERIC COMPOUNDS COMPRISING A PLURALITY OF VINYL GROUPS

Sidney Melamed, Philadelphia, Pa., assignor to Rohm & Haas Company, Philadelphia, Pa., a corporation of Delaware No Drawing. Application December 8, 1954,
Serial No. 474,003

19 Claims. (Cl. 260—78)

This invention relates to new organic compounds having a plurality of vinyl groups therein, and their polymers. More particularly the invention relates to poly(vinyl ether) compounds.

It is an object of the present invention to provide a new class of poly(vinyl ether) compounds which are stable under ordinary conditions but which can be converted to polymers and copolymers in the presence of suitable initiators.

The new compounds of the present invention in monomeric form have the structure of Formula I:

I  $(H_2C=CHOANRCO-)_nY$ where A is an alkylene group of 2 to 18 carbon atoms of which at least two carbon atoms thereof separate the adjoining O and N atoms, R is H or an alkyl group of 1 to 12 carbon atoms, including cyclohexyl, or benzyl, preferably being H or methyl, Y is a polyvalent (including di-, tri-, tetra-, and hexavalent) group, including alkylene and alkenylene groups, phenylene groups, oxaalkylene, or thia-alkylene groups, n is an integer having a value of 2 to 4, and preferably 2.

The compounds of the present invention may be produced by reacting an ester of an organic polybasic carboxylic acid having the structure of Formula II:

II  $(R'OCO-)_nY$ in which R' may be any alkyl group such as ethyl, propyl, butyl, octyl, but is preferably methyl, with an aminoalkyl vinyl ether having the Formula III:

III  $H_2C=CHOANHR$ in which the letters A and R have the same definitions given above. The reaction of the polybasic acid ester with the vinyl ether should be carried out in anhydrous conditions such as in glycols, dioxane or alcohols, especially methanol or ethanol. The reaction may be effected at 80° to 120° C. with or without a catalyst. It may be catalyzed with any strong basic catalyst, especially sodium methoxide, potassium butoxide, or any other alkali metal alkoxide. Generally the reaction may be completed in a period of one to eight hours depending on the particular reactants used, the temperature, and whether or not a catalyst is used. During the reaction, at least $n$ moles of the aminoalkyl vinyl ether are used per mole of the polybasic acid ester. Generally it is advisable to use an excess of the ether over the $n$ moles. An alternative procedure is to react the aminoalkyl vinyl ether with acid chlorides having the structure of Formula IV:

IV  $(ClCO-)_nY$

The reaction in this case may be carried out in either anhydrous or aqueous media. An excess of the amine over the required $n$ moles may be used as an acceptor for the acid liberated, or a tertiary amine such as pyridine, or an inorganic base, such as caustic soda or potash or sodium carbonate may be used. When an inorganic base is used, it is preferable to have an aqueous medium as the reaction medium, such as water alone or a mixture of water and an organic solvent, such as benzene or ether. In this reaction, the temperature is preferably kept low in the range of −10 to 30° C. and it is completed generally in a period of one to eight hours.

Examples of the polybasic acids of which the chlorides or esters may be used are the following: oxalic, succinic, malonic, glutaric, adipic, pimelic, suberic, azelaic, sebacic, 2,5-dimethyladipic, 4-ethyl-4-methyl pimelic, citric, tartaric, fumaric, maleic, di-(2-carboxyethyl)-ether, di - (2 - carboxyethyl)sulfide, 1,1,1-tris-(carboxymethyl)ethane, tetra-(carboxymethyl)methane, phthalic, isophthalic, terephthalic, trimesic, trimesitinic, pyromellitic, or mellitic.

Examples of aminoalkyl vinyl ethers that may be used include the following:

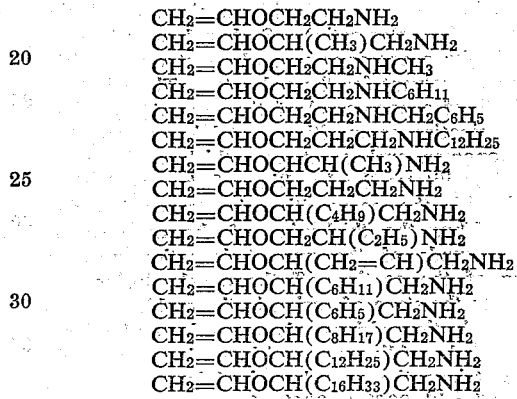

$CH_2=CHOCH_2CH_2NH_2$
$CH_2=CHOCH(CH_3)CH_2NH_2$
$CH_2=CHOCH_2CH_2NHCH_3$
$CH_2=CHOCH_2CH_2NHC_6H_{11}$
$CH_2=CHOCH_2CH_2NHCH_2C_6H_5$
$CH_2=CHOCH_2CH_2CH_2NHC_{12}H_{25}$
$CH_2=CHOCHCH(CH_3)NH_2$
$CH_2=CHOCH_2CH_2CH_2NH_2$
$CH_2=CHOCH(C_4H_9)CH_2NH_2$
$CH_2=CHOCH_2CH(C_2H_5)NH_2$
$CH_2=CHOCH(CH_2=CH)CH_2NH_2$
$CH_2=CHOCH(C_6H_{11})CH_2NH_2$
$CH_2=CHOCH(C_6H_5)CH_2NH_2$
$CH_2=CHOCH(C_8H_{17})CH_2NH_2$
$CH_2=CHOCH(C_{12}H_{25})CH_2NH_2$
$CH_2=CHOCH(C_{16}H_{33})CH_2NH_2$

The resulting compounds which are diamides, triamides, or tetramides, contain a plurality of vinyl ether groups. These monomeric compounds are stable under ordinary conditions and are generally solids except for a few cases wherein they are high-boiling liquids. They are stable against polymerization and decomposition under moderately elevated temperatures and in certain cases even up to 200 to 250° C. The unsaturated compounds are useful as bactericides, fungicides, and plasticizers, particularly for vinyl resins, such as polyvinyl chloride, polymers of acrylonitrile, esters of acrylic acid and methacrylic acid, such as methyl methacrylate and methyl acrylate, cellulose esters such as cellulose acetate and cellulose acetate butyrate. For these purposes, the compounds may be added in a wide range of proportions to compositions used in the paper, textile and leather industries for protecting cellulosic materials, paper or fabrics from fungal and bacterial attack. Examples are paper sizing compositions, textile sizing, dressing and conditioning compositions for rendering fibers, filaments or yarns more amenable for textile processing, such as carding, spinning, weaving and knitting. They may also be added to coating compositions to be applied to leather and other materials including textile fabrics for the purpose of inhibiting the development of mold or other fungi and bacteria on the coated articles. The compounds serve as intermediates for the production of other chemical products and in this relation they are highly reactive with nitrosyl chloride and in the presence of traces of acids with alcohols or hydroxyl group containing polymers, such as cellulose, cellulosic derivatives and polyvinyl alcohol. They are advantageous additives or modifiers for molding compositions of aminoplast type, such as of urea-formaldehyde or of melamine-formaldehyde. In this connection the compounds decompose in the presence of the acid catalyst at high temperatures producing an aldehyde of such character as to increase the water resistance of the molded articles obtained as compared to that of the articles obtained from the aminoplast resins without the addition of the modifiers.

In the presence of suitable initiators, the new monomeric compounds which are of polyethylenically unsaturated character may be polymerized to an insoluble and infusible condition. Generally, it is most advantageous to copolymerize a small proportion of the compounds of the present invention with a large proportion of a monoethylenically unsaturated monomer or a mixture thereof. In such copolymers the polyethylenically unsaturated compounds of the present invention serve as cross-linking agents useful to produce ion-exchanging resins and other thermosetting or insolubilizable types of compositions useful in lamination, such as of wood, glass and the like, or in the production of castings or molded articles. Those of the monomeric compounds of the present invention which are solids melting at 25° to 80° C. may be incorporated in such laminating or adhesive compositions as comprise an unsaturated polyester, such as the mixed ester of propylene glycol with maleic and phthalic acids (in a 50–50 molar ratio). Such polyester is generally mixed with a comonomer, such as styrene, which also serves as a solvent for the polyester. The addition of 10 to 20% of a compound of the present invention to such a laminating composition containing a polyester with a comonomer, such as styrene, thickens the composition and facilitates the handling of the panels that are coated with the composition in preparation for lamination. Thus the thickening of the composition by the compounds of the present invention prevent the flowing of the coating off the panels during the handling up to the stage of curing in the mold.

For the production of ion-exchange resins or laminating, casting, and molding compositions, the compounds of the present invention may be mixed in a proportion of 1% to 10% with 90% to 99% of one or more monoethylenically unsaturated compounds in conjunction with a suitable initiator, such as those of free radical type including benzoyl peroxide, acetyl peroxide, potassium and ammonium persulfates and acyclic azo catalysts. Typical azo catalysts are azodiisobutyronitrile, azodiisobutyramide, dimethyl (or diethyl or dibutyl) azodiisobutyrate, azobis(α,γ-dimethylvaleronitrile), azobis(α-methylbutyronitrile), azobis(α-methylvaleronitrile), dimethyl azobismethylvalerate, and the like. In these catalysts one of the carbons bonded to the tertiary carbon atom has its remaining valences satisfied by at least one element from the class consisting of oxygen and nitrogen.

Monoethylenically unsaturated comonomers that may be used are vinylidene halides such as vinyl fluoride, vinyl chloride, vinyl bromide, vinyl iodide, 1,1-difluoroethylene, 1,1-dichloroethylene; vinylidene hydrocarbons such as isobutylene, 1,3-butadiene, styrene; halovinylidene hydrocarbons such as 2-fluoro-1,3-butadiene, 2-chloro-1,3-butadiene, 2,3-dichloro-1,3-butadiene; acrylic, haloacrylic and alkacrylic esters, nitriles, and amides such as ethyl acrylate, methyl methacrylate, butyl methacrylate, methoxymethyl methacrylate, chloroethyl methacrylate, beta-diethylaminoethyl methacrylate, acrylonitrile, methacrylonitrile, acrylamide, methacrylamide; vinyl carboxylates such as vinyl formate, vinyl acetate, vinyl chloroacetate, vinyl butyrate, vinyl laurate; unsaturated aldehydes and ketones such as acrolein, methacrolein, methyl vinyl ketone; N-vinyl imides such as N-vinylphthalimide, N-vinylsuccinimide; unsaturated ethers such as vinyl ethyl ether, vinyloxyethylurea, aminoethyl vinyl ether, formamidoethyl vinyl ether, 2-phenoxy-1,3-butadiene; other vinyl monomers such as vinylpyridine, N-vinylcaprolactam; and other polymerizable or copolymerizable unsaturates such as tetrafluoroethylene, diethyl fumarate, dimethyl maleate, N-vinyl-N,N'-ethyleneurea and the like. Two or more vinylidene monomers may be copolymerized with the unsaturated ethers and esters of this invention.

The following examples are illustrative of the present invention:

Example 1

(a) A mixture of 48.5 g. (0.25 mole) of dimethyl phthalate, 87 g. (1 mole) of 2-aminoethyl vinyl ether and 5 g. of a 25% solution of sodium methoxide in methanol is heated under reflux for five hours. Methanol (23 ml.) is then removed by distillation until the pot temperature is 120°. The material is allowed to cool, and the resultant solid is washed well with 150 ml. of ice-water and collected by filtration. The solid is dissolved in 800 ml. of hot benzene containing a small amount of ethyl acetate (25–50 ml.) and filtered hot. The solid that precipitates when the solution is cooled is collected, dried, and recrystallized from a mixture of benzene and a small amount of ethyl acetate, yielding 65.6 g. of N,N'-bisvinoxyethyl-phthalamide as white needles having a melting point of 85 to 87.5° C., a yield of 86%.

*Analysis.*—Calculated for $C_{16}H_{20}N_2O_4$: C, 63.2; H, 6.58; N, 9.22. Found: C, 64.12; H, 6.69; N, 9.03.

At 1% concentration, the compound of this example exhibited no phytotoxicity against tomatoes and gave a 100% inhibition of germination of *Monilinia fructicola*. The compound is also an effective bactericide giving a 10 mm. zone of inhibition against *Micrococcus pyogenes var. aureus*.

(b) The process of part (a) is repeated substituting for the vinyl ether one mole of 3-aminopropyl vinyl ether. The product obtained, N,N'-bis(vinyloxypropyl)-phthalamide, is a solid.

(c) The procedure of part (a) hereof is repeated except that the vinyl ether is replaced with one mole of N-methyl-2-aminoethyl vinyl ether. The product, N,N'-dimethyl-N,N'-bis(vinyloxyethyl)-phthalamide, is a low-melting solid. As compared to the amide obtained in part (a) hereof, this amide is more soluble in organic solvents, such as methanol, ethanol, and benzene.

Example 2

(a) The procedure of Example 1 (a) is followed except that the phthalate is replaced with 0.25 mole of dimethyl glutarate. The product obtained, N,N'-bis(vinyloxyethyl)-glutaramide, has an analysis of 10.38% nitrogen, 57.78% carbon, and 8.19% hydrogen, corresponding closely to the theoretical values, 10.38% nitrogen, 57.8% carbon, and 8.15% hydrogen. On recrystallization from ethyl acetate, the compound exhibited a melting point of 124 to 126° C.

(b) The process of part (a) hereof is repeated replacing the vinyl ether with one mole of 2-amino-1-hexadecylethyl vinyl ether.

(c) The procedure of part (a) is repeated except that the glutarate is replaced with 0.25 mole of the dimethyl ester of di-(2-carboxyethyl) ether and the amine was replaced with one mole of 2-amino-1-cyclohexyl-ethyl vinyl ether.

(d) The procedure of part (c) was repeated replacing the ester with 0.25 mole of the dimethyl ester of di-(2-carboxyethyl) sulfide.

Example 3

(a) The procedure of Example 1 is followed substituting 0.25 mole of dimethyl sebacate for the phthalate. The product, N,N'-bis(vinyloxyethyl)-sebacamide, on recrystallization from ethyl acetate had a melting point of 128 to 130° C. It effected a 100% inhibition of germination of *Stemphylium sarcinaeforme* at 1% concentration and showed no phytotoxicity against tomatoes. It is an efficient bactericide giving a 9 mm. zone of inhibition of *Micrococcus pyogenes var. aureus*.

(b) The procedure of part (a) is repeated substituting for the vinyl ether one mole of 2-methylaminoethyl vinyl ether.

Example 4

(a) The procedure of Example 1 is repeated except that the dimethyl phthalate is replaced with 0.25 mole of dimethyl 2,5-dimethyl-adipate. On recrystallizing the product, N,N'-bis(vinyloxyethyl)-2,5-dimethyladipamide, it showed a melting point of 126° C.

At 1% concentration, the product exhibited no phytotoxicity against tomatoes and gave a 100% inhibition of germination of Monilinia fructicola.

(b) One mole of the bis-acid chloride derived from 2,5-dimethyladipic acid is added to a solution of 4 moles of 2-(cyclohexylamino)ethyl vinyl ether in dry benzene. The precipitate of amine hydrochloride is removed by filtration and the product, N,N'-bis-2-(cyclohexylamino)-ethyl-2,5-dimethyladipamide, is isolated by concentration of the benzene solution.

(c) The procedure of part (b) hereof is repeated substituting four moles of N-methyl-2-aminoethyl vinyl ether for the vinyl ether thereof.

Example 5

(a) The procedure of Example 1 is repeated replacing the phthalate with 0.2 mole of triethyl trimesate. The product, N,N',N''-tris(vinyloxyethyl)-trimesamide, after recrystallization from aqueous methanol had a melting point of 148 to 149° C.

(b) The procedure of part (a) is repeated replacing the vinyl ether with 2-(benzylamino)ethyl vinyl ether and replacing the trimesate with trimethyl trimesate. The compound obtained is a good plasticizer for polyvinyl chloride when incorporated in a proportion of 15% to 25% on the weight of the polymer.

Example 6

(a) The procedure of Example 1 is repeated replacing the phthalate with 0.2 mole of tetraoctyl pyromellitate. The product, N,N',N'',N'''-tetrakis(vinyloxyethyl)-pyromellitamide, on recrystallization from ethanol had a melting point above 200° C.

*Analysis.*—Calculated: 10.6% N, 58.8% C, and 6.42% H. Found: 10.61% N, 58.74% C, and 6.60% H.

(b) The acid chloride derived from pyromellitic acid is added to four molar equivalents of 2-(dodecylamino) ethyl vinyl ether in a mixture of potassium carbonate, water and benzene at 0 to 10° C. with efficient stirring. The benzene is removed at reduced pressure and the residue leached with water to remove salt. The residual product gradually solidifies and may be purified by recrystallization.

(c) The procedure of part (a) hereof is repeated except that the vinyl ether is replaced with one mole of 5-aminopentyl vinyl ether.

Example 7

Fumaryl chloride, 0.25 mole, is added slowly to a benzene solution containing one mole of 2-aminoisobutyl vinyl ether at 0 to 5° C. with efficient stirring. The amine hydrochloride that precipitates is removed by filtration and the benzene solution obtained as the filtrate is concentrated to give the product, N,N'-bis-(1,1-dimethyl-2-vinyloxyethyl)fumaramide, which is purified by recrystallization.

Example 8

(a) Thirty-three parts of the N,N'-bis(vinyloxyethyl)-glutaramide obtained in Example 2 (a) is mixed with 66 parts of dimethylformamide and 5 parts by weight of dimethyl azoisobutyrate as a catalyst. The mixture is heated to 75° C. for 16 hours at which time 100% conversion to polymer was obtained.

(b) One part by weight of the N,N'-bis(vinyloxypropyl)phthalamide obtained in Example 1 (b) is mixed with 66 parts by weight of dimethylformamide and 31 parts by weight of dimethylaminoethyl acrylate and 2 parts by weight of dimethyl azoisobutyrate. Copolymerization at 75° C. for 16 hours produced an insoluble copolymer having anion-exchange properties.

(c) The procedure of part (b) hereof is followed substituting one part by weight of N,N'-dimethyl-N,N'-bis-(vinyloxyethyl)phthalamide for the phthalamide of part (b). A similar ion-exchange copolymer is obtained.

(d) A mixture of one part of N,N'-bis(vinyloxyethyl)-sebacamide obtained in Example 3 (a), 66 parts of dimethylformamide, 30 parts of methyl acrylate and 3 parts by by weight of dimethyl azoisobutyrate is heated to 75° C. for 16 hours. The copolymer obtained is then introduced into a mixture of 90 parts of dioxane and 10 parts of water containing two parts by weight of potassium hydroxide and the mixture is then heated at 80° C. for five hours, thereby hydrolyzing the methyl acrylate units of the polymer to acrylic acid units.

(e) The procedure of part (a) hereof is repeated substituting the N,N'-dimethyl-N,N'-bis(vinyloxyethyl)-2,5-dimethyladipamide of Example 4 (c) for the glutaramide.

It is to be understood that changes and variations may be made without departing from the spirit and scope of the invention as defined in the appended claims.

I claim:

1. As a new composition, a compound having the structure of Formula I.

I  $(H_2C=CHOANRCO—)_nY$ where A is an alkylene group of 2 to 18 carbon atoms of which at least two carbon atoms thereof separate the adjoining O and N atoms, R is selected from the group consisting of H, cyclohexyl, benzyl, and alkyl groups of 1 to 12 carbon atoms, Y is selected from the group consisting of alkylene, alkenylene, phenylene, oxa-alkylene, and thia-alkylene groups, tri- and tetravalent saturated aliphatic hydrocarbon groups, tri- and tetravalent saturated aliphatic hydroxyl-substituted hydrocarbon groups, and tri-, tetra-, and hexavalent monocyclic aromatic hydrocarbon groups, and $n$ is an integer having a value of 2 to 4.

2. As a new composition, a compound of the structure of Formula I as defined in claim 1 except that R is hydrogen and Y is an alkylene group.

3. As a new composition, a compound having the structure of Formula I as defined in claim 1 except that R is hydrogen, Y is a phenylene group and $n$ is 2.

4. As a new composition, a compound having the structure of Formula I as defined in claim 1 except that R is hydrogen, Y is an alkylene group and $n$ is 2.

5. As a composition of matter, N,N'-dimethyl-N,N'-bis(vinyloxyethyl)phthalamide.

6. As a composition of matter, N,N'-bis(vinyloxyethyl)-glutaramide.

7. As a composition of matter, N,N'-bis(vinyloxyethyl)-sebacamide.

8. As a composition of matter, N,N',N'',N'''-tetrakis-(vinyloxyethyl)-pyromellitamide.

9. As a new composition of matter, a polymer of a compound having the structure of Formula I as defined in claim 1.

10. As a composition of matter, a copolymer of a minor proportion of a compound having the structure of Formula I as defined in claim 1 with a major proportion of at least one monoethylenically unsaturated copolymerizable monomer.

11. As a new composition of matter, a polymer of N,N'-bis(vinyloxyethyl)-phthalamide.

12. As a new composition of matter, a polymer of N,N'-bis(vinyloxyethyl)-glutaramide.

13. As a new composition of matter, a polymer of N,N'-bis(vinyloxyethyl)-sebacamide.

14. As a new composition of matter, a polymer of N,N',N'',N'''-tetrakis(vinyloxyethyl)-pyromellitamide.

15. As a composition of matter, a copolymer of a minor proportion of N,N'-bis(vinyloxyethyl)-glutaramide with a major proportion of dimethylaminoethyl acrylate.

16. As a composition of matter, a polymer of N,N'-dimethyl-N,N'-bis(vinyloxyethyl)-phthalamide.

17. A composition of matter comprising a compound of the structure of Formula I as defined in claim 1 except that R is methyl and $n$ is 2.

18. As a new composition, a compound having the structure of Formula I as defined in claim 1 except that R is methyl, Y is an alkylene group and $n$ is 2.

19. A composition of matter comprising N,N'-bis(vinyloxyethyl)phthalamide.

References Cited in the file of this patent

UNITED STATES PATENTS 2,686,173    Sauer _____ Aug. 10, 1954